United States Patent
Miichi et al.

(10) Patent No.: US 7,190,814 B2
(45) Date of Patent: Mar. 13, 2007

(54) IMAGE COMPARISON APPARATUS AND METHOD FOR CHECKING AN IMAGE OF AN OBJECT AGAINST A STORED REGISTRATION IMAGE

(75) Inventors: Kunihiro Miichi, Kyoto (JP); Hiroyuki Iwao, Kyoto (JP)

(73) Assignee: Omron Corporation, Kyoto (JP)

( * ) Notice: Subject to any disclaimer, the term of this patent is extended or adjusted under 35 U.S.C. 154(b) by 609 days.

(21) Appl. No.: 09/974,898

(22) Filed: Oct. 12, 2001

(65) Prior Publication Data

US 2002/0090116 A1 Jul. 11, 2002

(30) Foreign Application Priority Data

Oct. 13, 2000 (JP) .............................. 2000-312920

(51) Int. Cl.
*G06K 9/00* (2006.01)
*G06K 9/62* (2006.01)
*G06K 9/36* (2006.01)
*H04N 7/18* (2006.01)

(52) U.S. Cl. ...................... 382/118; 382/209; 348/156; 340/5.53

(58) Field of Classification Search ........ 382/115–118, 382/209; 348/152, 154, 155, 156; 340/5.52, 340/5.53, 5.8, 5.81–5.83, 825.36
See application file for complete search history.

(56) References Cited

U.S. PATENT DOCUMENTS

| 3,564,132 | A | * | 2/1971 | Baker et al. ................ 348/156 |
| 5,063,603 | A | * | 11/1991 | Burt ........................... 382/115 |
| 5,164,992 | A | * | 11/1992 | Turk et al. ................... 382/118 |
| 5,386,103 | A | * | 1/1995 | DeBan et al. ............... 235/379 |
| 5,991,429 | A | * | 11/1999 | Coffin et al. ................ 382/118 |
| 6,069,655 | A | * | 5/2000 | Seeley et al. ............... 348/154 |
| 6,154,133 | A | * | 11/2000 | Ross et al. .................. 340/541 |
| 6,418,235 | B1 | * | 7/2002 | Morimoto et al. .......... 382/118 |
| 6,687,386 | B1 | * | 2/2004 | Ito et al. ..................... 382/103 |
| 2002/0015094 | A1 | * | 2/2002 | Kuwano et al. ............ 348/143 |

\* cited by examiner

*Primary Examiner*—Vikkram Bali
*Assistant Examiner*—Colin LaRose
(74) *Attorney, Agent, or Firm*—Dickstein Shapiro LLP (57) ABSTRACT

The present invention relates to an image comparison apparatus and method in which images are acquired using a photograph unit and comparing them with a registration of memorized images. The photograph unit acquires a plurality of images of the photograph object during a period from detection of the photograph object by the object detection sensor until a press of a button. After which, the acquired image is compared with previously memorized registration images and a comparison result indicating whether or not a match exists is outputted.

24 Claims, 8 Drawing Sheets

FIG. 5 ically attached to a door 76 or a wall surface in the
IMAGE COMPARISON APPARATUS AND METHOD FOR CHECKING AN IMAGE OF AN OBJECT AGAINST A STORED REGISTRATION IMAGE

FIELD OF THE INVENTION

The present invention relates to an image comparison apparatus for photographing, for example, a face of a person and making a comparison and a check, and more particularly to an apparatus and method for acquiring images and comparing them with previously memorized registration images and outputting a match if one exists.

DESCRIPTION OF THE RELATED ART

In general, in this kind of image comparison apparatus, an image of a person, acquired by using a camera, is checked against previously registered registration images so that the identity of the person in question is confirmed.

Figure 7:
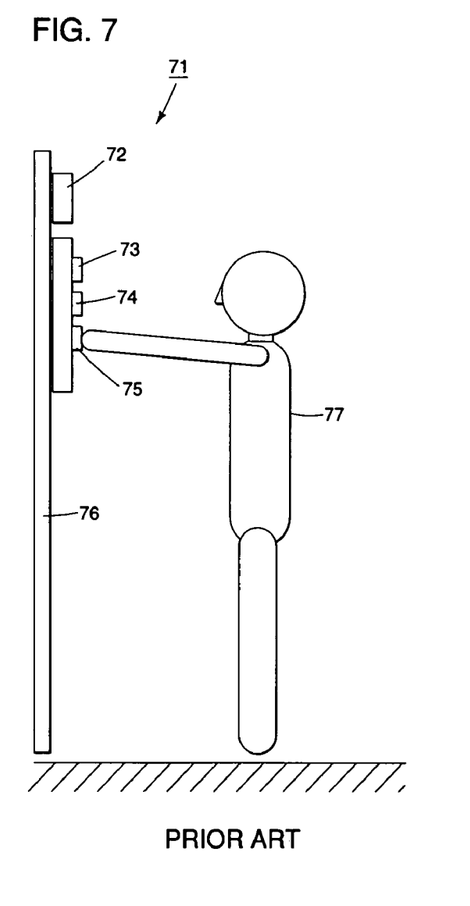
FIG. 7 is a schematic side view showing a use state of a conventional image comparison apparatus.

For example, in the case where the image comparison apparatus is applied to a gate function for managing those entering and exiting a room, as shown in FIG. 7, an image comparison apparatus 71 comprise an illumination device 72, a camera 73, a person detection sensor 74, and a photograph start check button 75, the apparatus 71, is typically attached to a door 76 or a wall surface in the vicinity of the door.

In the case where a person 77 enters or exits a room, the image comparison apparatus 71, when the person 77 stops at a check position and presses down the check button 75, photographs the face of the person 77 approaching the camera 73, and the photographed face image is compared with previously registered face images to check and confirm consistence/inconsistence, and provides the basis for the entrance and exit being permitted or the entrance and exit being restricted of the person.

Figure 8:
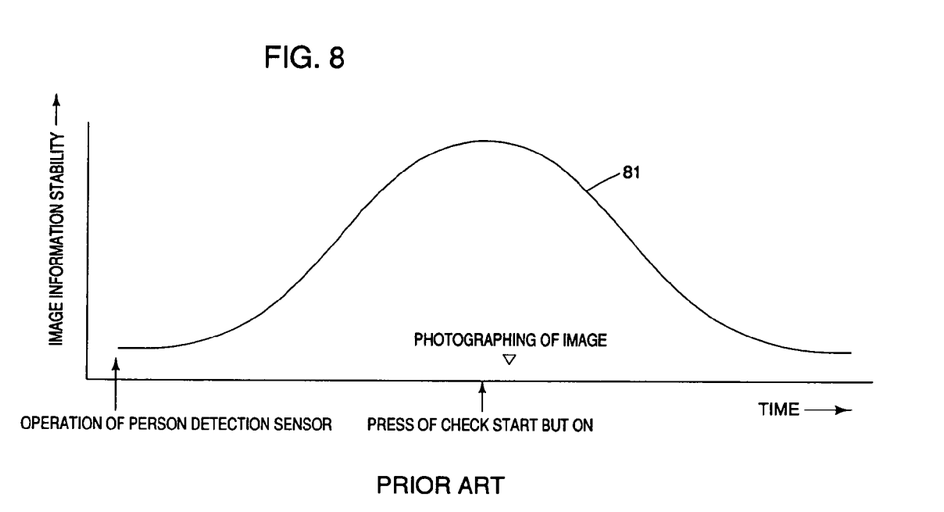
FIG. 8 is a diagram showing an image information acquisition curve and a photograph timing of a camera when a photograph is taken by the conventional image comparison apparatus.

In this case, as shown by the image information acquisition curve 81 of FIG. 8, at the time when the person stops at the check position suitable for photographing by the camera and presses down the check button, the face image of the person can be obtained most accurately. On the other hand, there is known that as the person goes away from the position of the check button it becomes more difficult to accurately capture the face image of the person, and there is a tendency that the accuracy and stability of image information is lowered.

When the check button is pressed down, if the person closes the eyes, opens the mouth, or looks away, causing the face image to appear different from the registered image, even if the person is the person in question, it is judged that the face image is a poor image and a recheck operation will check the image again.

This recheck operation is repeated until the number of operations reaches the number of predetermined retry times, and if check confirmation can not be made, an input operation using a personal identification key or readout using a check card will be carried out.

However, the number of retry operations are increased due to the recheck, it is inconvenient to the person attempting to enter or exit a room, and, a smooth use cannot be realized. Additionally, there is an increased processing time and delay at the entrance and exit. There also is an increased amount of labor to execute a check operation.

SUMMARY OF THE INVENTION

The present invention is to provide an image comparison apparatus and method, which has a high check function in which when an acquired image is obtained when a button for check confirmation is pressed down, and a plurality of images prior to the check button being pressed and are checked and confirmed.

According to an aspect of the present invention, an image comparison apparatus in which an image of a photograph object is acquired by using photograph means, and in a case where a button for check confirmation is pressed down, the acquired image is compared with information concerning previously memorized registration images, and a comparison result is outputted, the image comparison apparatus characterized in that an object detection sensor for detecting existence of the photograph object is provided, the photograph means acquires a plurality of images of the photograph object during a period from detection of the photograph object by the object detection sensor to a press of the button, and in a case where the button is pressed, at least one of the plurality of acquired images is compared with the information concerning the previously memorized registration image.

As a result, even if a check poor image is produced at the time of check of the photograph object when the button for check confirmation is pressed down, since the check can be made by using a complementary image obtained at the timing before that, the image suitable for check judgment of the photograph object can always be ensured at the time of check, a recheck operation is omitted, and a check processing can be carried out in a short time.

According to another aspect of the present invention, an image comparison method comprises the steps of detecting existence of a photograph object, capturing a plurality of images of the photograph object in a case where the photograph object is detected, detecting a press of a button for check confirmation, comparing at least one of the plurality of captured images with information concerning previously memorized registration images when the press of the button is detected, and outputting a comparison result.

If the photograph object is checked by the procedure of such comparison and check steps, even if a suitable check image is not obtained at the point of time when the button for check confirmation is pressed down, the check confirmation can be made by using another image, so that it becomes unnecessary to repeatedly press down the button, and the check process can be completed by one operation.

According to another aspect of the present invention, an image comparison center apparatus compares a captured image with information concerning registration images previously memorized in memory means, and outputs a comparison result, in which the image comparison center apparatus is characterized in that a plurality of captured images of a same object are successively compared with the registration images memorized in the memory means, and as a result of the comparison a proper judgment result is outputted in a case where there is a similar image satisfying a check judgment threshold, and an improper judgment result is outputted in a case where there is no similar image satisfying the check judgment threshold in the plurality of images.

If there is a similar image satisfying the check judgment threshold in the plurality of photographed images, the proper judgment result is outputted, and if there is no similar image satisfying the check judgment threshold, the improper judgment result is outputted, so that the plurality of images concerning the same object are used on a screen for check judgment, and check confirmation with high accuracy can be made.

According to still another aspect of the present invention, an image comparison system captures an image of a photograph object by use of a photograph means, compares the captured image with registration images previously memorized in memory means, and outputs a comparison result, in which the image comparison system is characterized in that a plurality of captured images of a same object are successively compared with the information concerning the registration images memorized in the memory means, and as a result of the comparison, a proper judgment result is outputted in a case where there is a similar image satisfying a check judgment threshold, and an improper judgment result is outputted in a case where there is no similar image satisfying the check judgment threshold in the plurality of images.

Since the check properness can be confirmed by successively comparing the plurality of photographed images with the the registration images memorized in the memory means, an image coincident with the registered image can be obtained without fail.

According to still another aspect of the present invention, where an image acquired at the point of time when the button for check confirmation is pressed down is a check poor image, a check is made by using the image acquired nearest in time to the time the button is pressed from the plurality of images acquired prior to the press of the button.

According to still another aspect of the present invention, a display means for displaying a check state at the time of check is provided.

In this invention the check state, such as check success and check failure is displayed and guided at the time of the check, a photographed person can look at the display guide and can immediately determine confirmation, and the check processing can be executed while a sense of security is given to the photographed person.

In the present invention the photograph object includes the face of a check person, and the whole and specific portions of various objects.

DESCRIPTION OF THE PREFERRED EMBODIMENTS

An embodiment of the present invention will be hereinafter described in detail with reference to the drawings.

Figure 1:
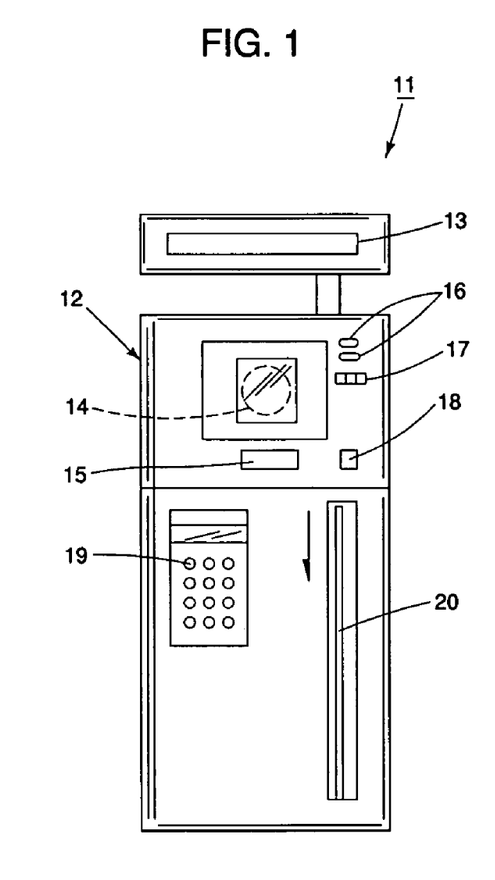
FIG. 1 is a front view showing an image comparison apparatus of the present invention.

The drawings show an image comparison apparatus installed at an image acquisition side of an image comparison system in which a face of a person is photographed and is checked. As shown in FIG. 1, the image comparison apparatus 11 is constructed by installing an operation panel 12 having a check data acquisition function on a door surface which is used for entrance and exit.

The image comparison apparatus comprises an operation panel 12 that is attached at the height of a person's face, an illumination device 13 for illuminating the face is disposed at its upper portion, a camera 14, a person detection sensor 15, a check result display LED 16, a check count display LED 17, and a check start button 18 are disposed at its intermediate portion, and a personal identification key 19 and a card reader 20 are disposed at its lower portion.

In the illumination device 13, a plurality of illuminating LEDs are arranged, and illumination is made toward the forward position of the face height. The roughness state of a face of a person approaching the camera 14 is clearly illuminated to raise the face image acquisition performance of the camera 14.

The foregoing camera 14 photographs a face image by using a CCD camera or the like, and when a person approaches the front of the camera 14, the person detection sensor 15 such as a reflection type infrared sensor detects the approach of the person, the camera 14 starts to photograph from the point of time of the detection until the check start button 18 is pressed down. During that period a plurality of face images of the person are photographed.

Even if a check poor image is produced in an image acquired at the time when the check start button 18 is pressed down, for the purpose of making a check using a complementary image acquired at a time prior to the plurality of images as the complement are acquired.

Thereafter, when the check start button 18 is pressed down, it is judged to be a check request of a person and the check is started. At this time, a check result of consistence or inconsistence of the person who was checked, is displayed on the check result display LED 16. The check result display LED 16 is designed such that a light of a blue or red judgment result is turned on at one of two LEDs of different colors to enable recognition at a glance.

Besides, at the time of the check, a check state, for example, a first check, or a second or third check due to failure of a check, is displayed in real time by the check count display LED 17 including a plurality of LEDs, so that the person being checked is made to clearly recognize it.

Like this, it is possible to recognize the check properness by the lighting display of the check result display LED 16 and it is possible to grasp the check state by looking at the display guide of the check count display LED 17, so that the person being checked can execute the check processing at ease without having a distrust or a sense of unease at the time of the check use.

The person detection sensor is used, for example a light emitting diode for irradiating infrared rays as a light source, a reflection type distance detection function to detect the existence of the person being checked by detecting reflected light of the infrared rays.

During the comparison process, not only can the check start button 18 be used, but also the personal identification key 19 may be used, or the card reader 20 may be used, and further, these may be used together.

The personal identification key 19 and the card reader 20 have an independent check function, and if the person being checked inputs a given personal identification number for identifying the person being checked by using the personal identification key 19, check confirmation is made based on the personal identification information and, the door being used for entrance or exit is unlocked. If the card reader 20 is used, the ID data of a card in which the ID data for identifying the person being checked is read out and recognized, the door is unlocked.

Figure 2:
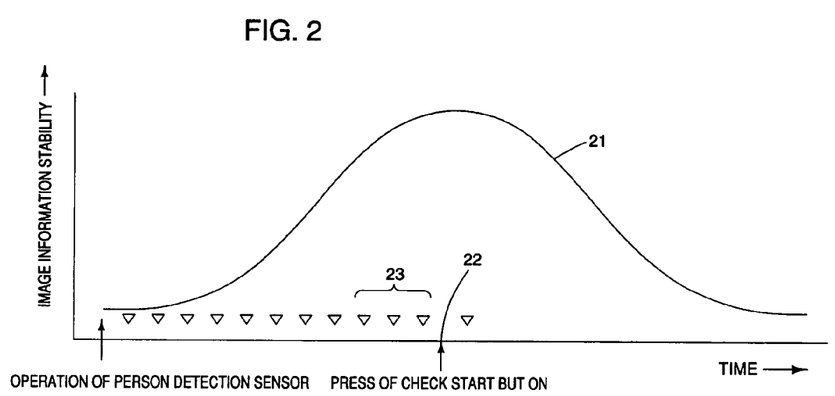
FIG. 2 is a diagram showing an image information acquisition curve and a photograph state of a camera.

FIG. 2 shows an image information acquisition curve 21 when the camera photographs the face image of the person being checked. The image information acquisition curve 21 shows that at the time when the check start button 18 is pressed down, the face information of the person being checked can be obtained most accurately and the stability of the image is increased.

During the period between the detection of the person being checked by the person detection sensor 15 until the pressing of the check start button 18, the camera 14 photographs the face image of the person being checked plural times and acquires the images, and in the case where the check start button 18 is pressed, at least one of the plurality of acquired images is compared with information concerning previously memorized registration images.

At the comparison of the images, a proper judgment result is outputted in the case where there is a similar image satisfying a previously determined check judgment threshold, and an improper judgment result is outputted in the case where there is no similar image satisfying the check judgment threshold in the plurality of images. Thus, if the plurality of images concerning the same person being checked are used on the screen for check judgment, check confirmation with high accuracy can be made, and in the case of the registered person being checked, an image coincident with the registered image can be obtained without fail.

As a result, even if the expression of the face at the point of time when the check start button 18 is pressed down is changed as compared with that at the normal time and is judged to be a check poor image, a recheck can be made by using the plurality of images previously taken.

Particularly, since the person being checked is photographed plural times and the plurality of face images are obtained, the check confirmation can be made by any of the images, and the check processing can be completed by one button press operation without troubling the person being checked.

When the plurality of acquired images of the person being checked are checked, the last image 23 acquired in order of time prior to the button being pressed 22 is used to make the check. The check can be made in order of timing near the image acquired at the point of time of the press of the button, which is most suitable for the check.

Figure 3A:
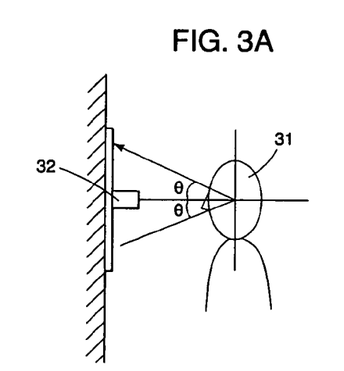
FIG. 3 is an explanatory view showing a lean angle state of a check object person who uses the image comparison apparatus of the present invention.
Figure 3B:
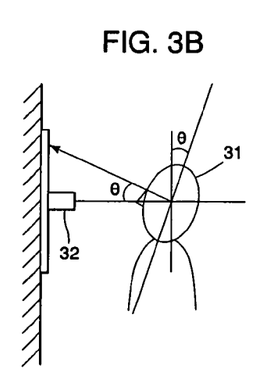
Figure 3C:
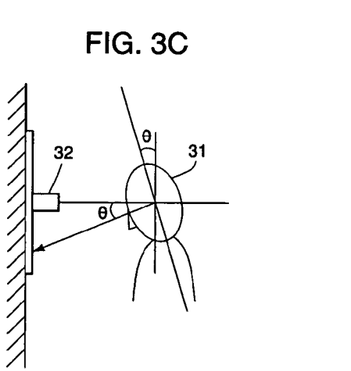

Accordingly, as shown in FIG. 3A, in the case where the face of the person 31 being checked is directed toward the front, an image suitable for the check can be obtained. On the other hand, in the case where the face of the check object person 31 is directed obliquely upward as shown in FIG. 3B, or in the case where it is directed obliquely downward as shown in FIG. 3C, a slight lean angle θ is produced in the eyes with respect to a front camera 32. When the lean angle is θ=0°, the image becomes more stable, and when it exceeds θ=15°, a feature amount of the face cannot be accurately calculated, and the image becomes unstable.

Accordingly, when only one image at the time of the press of the button is used, limitation occurs in the check processing. Therefore, the check is complemented by an after-mentioned control processing.

Figure 4:
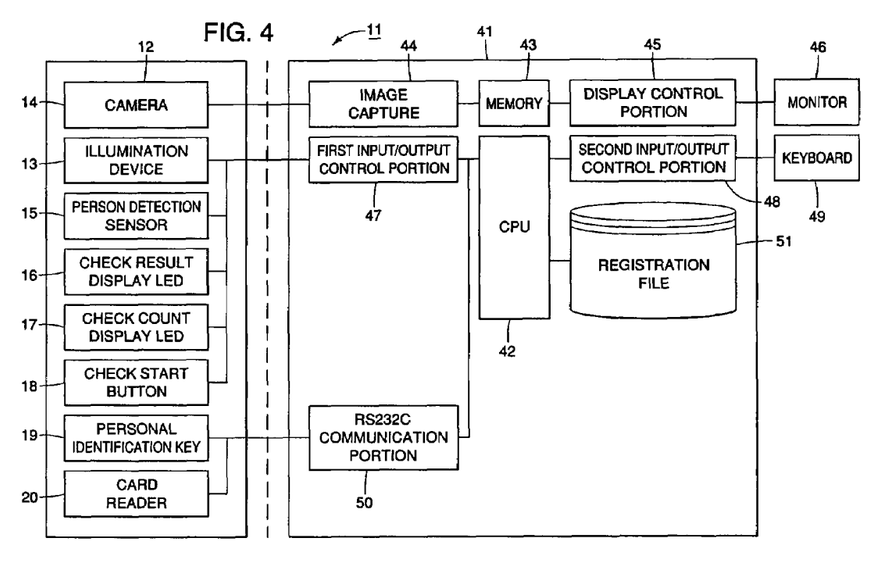
FIG. 4 is a control circuit block diagram of an image comparison system of the present invention.

FIG. 4 is a control circuit block diagram of an image comparison system, which is constructed by an image comparison center apparatus 41 for controlling the respective instruments provided on the operation panel 12 of the image comparison apparatus 11, and a CPU 42. The CPU 42 controls respective circuit devices along a program stored in a memory 43, and the control data is memorized in the memory 43.

An image capture device 44 acquires an image photographed by the camera 14, and causes it to be memorized in the memory 43. The acquired image is displayed on a monitor 46 for monitoring through a display control portion 45.

A first input/output control portion 47 controls respective input/output data of the illumination device 13, the person detection sensor 15, the check result display LED 16, the check count display LED 17, and the check start button 18, and a second input/output control portion 48 controls input from a keyboard 49 for an entrance and exit monitor room.

An RS232C communication portion 50 has a communication connection function to transmit input data from the card reader 20 and the personal identification key 19 to the CPU 42.

A registration file 51 is provided as a database file at the time of registration of a face image, and the data of the face image feature amount of respective registered persons is stored here.

The CPU 42 checks the face image information of the person photographed by the camera 14 against the previously registered registration information, and determines the consistence or inconsistency of the person being checked, and based on the judgment result, permission of entrance and exit or the restriction of entrance and exit is carried out.

The entrance and exit state is displayed by the monitor 46 connected to the image comparison center apparatus 41, and the data input and the opening control of the door by a supervisor are allowed using the keyboard 49.

Figure 5:
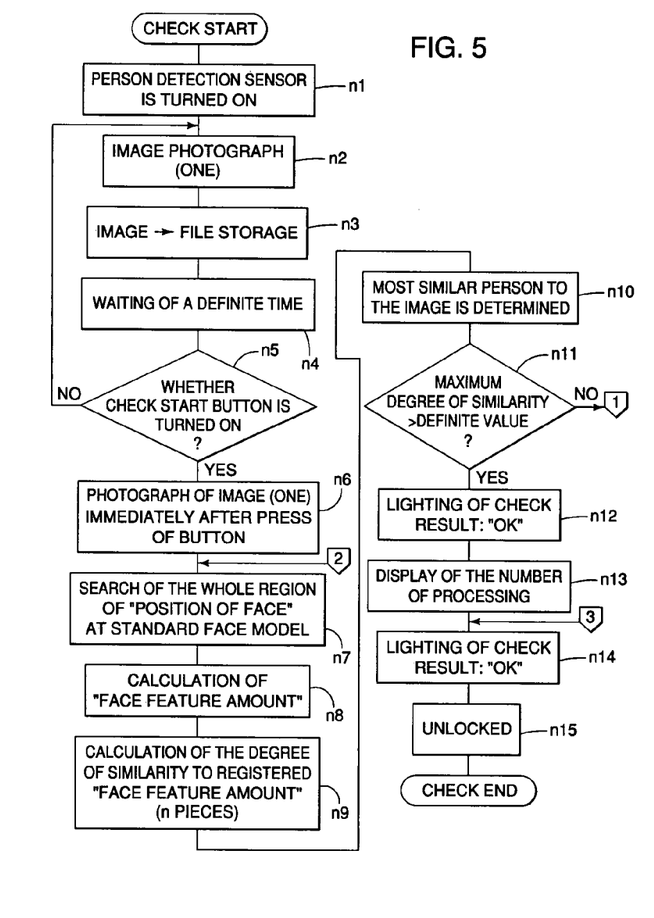
FIG. 5 is a flowchart showing a check processing operation using the image comparison system of the present invention.
Figure 6:
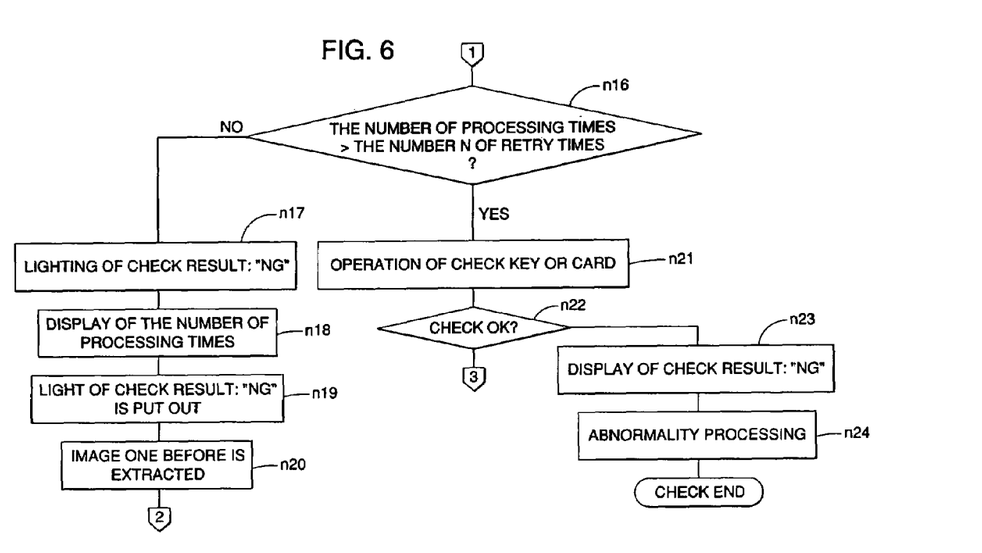
FIG. 6 is a flowchart subsequent to FIG. 5.

A processing operation when a check use is made by using the image comparison system constructed by the preferred embodiment will be described with reference to flowcharts of FIGS. 5 and 6.

When a person who makes an entrance and exit use approaches the door of a room provided with the image comparison apparatus 11, the person detection sensor 15 first detects and confirms the presence of a person (step n1).

On the basis of a detection signal of the sensor 15, the camera 14 starts to photograph (step n2), and the image obtained by the camera 14 is stored in the memory 43 of the image comparison center apparatus 41 (step n3).

At the time of the image acquisition, after one face image is acquired, a next face image is photographed for grasping a change in the eyes and direction of a face elapses (step n4).

A photograph is repeatedly taken until the person being checked presses down the check start button 18. It is preferable that an upper limit of the number of acquired photographs is fixed, so that a photograph is not unnecessarily taken. When the person being checked presses down the check start button 18 (step n5), the CPU 42 acquires an image of the person being checked immediately (step n6).

The CPU 42 compares and checks the acquired face image with previously registered face images, and determines the degree of similarity. At the judgment, the face feature amount of eyes, a nose, a mouth or the like which becomes features at the check time is extracted and are checked (steps n7 to n10).

If the check judgment results in consistence, the check result display LED 16 displays the consistence by lighting (steps n11 to n12), and the check count display LED 17 displays that the check processing is the first and that the check result is the consistence (steps n13 to n14), and at the same time, the door for entrance and exit is unlocked, and the entrance and exit of the person being checked is permitted (step n15)

On the other hand, in the case where the CPU 42 judges that the check is impossible, an automatic check judgment is repeatedly carried out within the limit of the previously determined number of check times (step n16).

For example, when the image acquired immediately after the press of the check start button 18 is checked, and is judged to be a check poor image since the person being checked closes the eyes, opens the mouth or looks away, so that the CPU 42 makes a judgment of improper judgment result, the check result display LED 16 displays check processing failure by lighting (step n17), and at the same time, the check count display LED 17 displays and guides how many times the check processing has been repeated (step n18). At the time of the recheck, after the lights of the check result display LED 16 are put out (step n19), the CPU 42 extracts an image at a time prior to the point of time of the press of the button among the plurality of acquired images of the person being checked and starts to recheck (step n20).

If the consistence is not obtained though the recheck is made, the recheck is further made by using the acquired image in order of time prior to the press of the button. If consistence is not obtained, a similar recheck operation is repeatedly carried out, and when the number of operations reaches the previously determined check limit number of times, another check means is shown, and if the person being checked inputs a personal identification number by using the personal identification key 19, or the card reader 20 is used to read the card data and check confirmation can be made, an entrance and exit gate is unlocked and the entrance and exit is permitted (steps n21 to n22).

However, in the case where the check confirmation cannot be made even if the number reaches the previously determined check limit number of times, or in the case where the improper judgment result is obtained even if the personal identification key 19 or the card reader 20 is used, the improper judgment result is displayed on the check result display LED 16 and the restriction of entrance and exit is made (steps n23 to n24).

In the correspondence of the present invention and the foregoing embodiment, the photograph means of the present invention corresponds to the camera 14, 32 of the embodiment, and similarly in the following, the photograph object corresponds to the person being checked 31, the button for check confirmation corresponds to the check start button 18, the object detection sensor corresponds to the person detection sensor 15, the memory means corresponds to the memory 43 or the registration file 51 and the display means corresponds to the check result display LED 16 and the check count display LED 17. However, the present invention can be applied on the basis of the technical concept recited in the claims, and is not limited only to the structure of the foregoing embodiment.

According to the present invention, even if a proper check image can not be obtained at the point of time when a button for check confirmation is pressed down, check confirmation can be made by using another image, so that it becomes unnecessary to repeatedly press down the button, and a check processing can be completed by one button press operation.

It is appreciated that the image comparison apparatus is not limited to only checking a person, but include any object that is identifiable by photograph.

What is claimed is:

1. An image comparison apparatus, comprising:
   an object detection sensor for detecting existence of a photograph object;
   a camera responsive to said object detection sensor for acquiring a plurality of acquired images prior to the pressing of a check start button and responsive to operation of said check start button for acquiring another at least one acquired image of the photograph object after the pressing of said check start button;
   a comparison system for initiating a comparison of said another at least one acquired image with at least one previously memorized registration image, and outputting a first comparison result indicating whether said another at least one acquired image matches said at least one registration image; and
   in a case where the first comparison result indicates no match, said comparison system initiates a second comparison of one of the prior acquired images obtained prior to said another at least one acquired image and compares said prior acquired image with said at least one registration image and outputs a second comparison result.

2. An image comparison method, comprising the steps of:
   detecting the presence of an object to be checked;
   capturing a plurality of acquired images of the object;
   detecting a press of a check start button;
   comparing at least one of the plurality of acquired images with at least one registration image;
   outputting a first comparison result indicating whether said at least one acquired image matches said at least one registration image; and
   repeating said comparing step using another of said acquired images having been captured prior to said check start button being pressed, if said first comparison result indicates no match, and repeating said comparing step until at least one of said plurality of acquired images matches at least one registration image or until there are no more acquired images for comparison.

3. The method of claim 2 further comprising:
   determining that an image acquired immediately after the check start button is pressed does not match said at least one registration image; and
   selecting a second acquired image from said plurality of acquired images for comparison, said second acquired image having been captured prior to said check start button being pressed.

4. The method of claim 3 further comprising:
   determining that said second acquired image does not match said at least one registration image; and
   selecting a third acquired image from said plurality of acquired images for comparison, said third acquired image having been captured prior to the capture of said second acquired image.

5. The method of claim 3 further comprising:
   determining that said second acquired image does not match said at least one registration image; and
   comparing a personal identification code received at a personal identification keypad with a previously stored personal identification code to determine whether a match exists.

6. The method of claim 3 further comprising:
   determining that said second acquired image does not match said at least one registration image; and
   comparing a personal identification code read from an identification card with a previously stored personal identification code to determine whether a match exists.

7. An image comparison apparatus, comprising:
   an object detection sensor for detecting a person to be photographed;
   a camera for creating at least one photographic image upon detection by said object detection sensor of said person; and a check start button for causing the camera to create another at least one photographic image of said person after the pressing of said check start button and for beginning a comparison between said another at least one photographic image created after the pressing of said check start button and registration images previously stored by said image comparison apparatus in order to determine whether a match exists and for outputting at least one comparison result, wherein:

a positive result is outputted in a case where there is a created photographic image and registration image pair satisfying a check judgment threshold; and a negative result is outputted in a case where there is a created photographic image and registration image pair that do not satisfy the check judgment threshold; and where there is a negative result, the comparison apparatus compares one of the photographic images of the object created before the pressing of said check start button with said registration images.

8. The image comparison apparatus of claim 7 further comprising: an image comparison center apparatus for capturing said at least one photographic image created by said camera and comparing it with said registration images previously stored.

9. The image comparison apparatus of claim 7 further comprising: an illumination device for illuminating a subject to be photographed by said camera.

10. The image comparison apparatus of claim 7 further comprising: a check count display for displaying a number of times a check operation has been conducted.

11. The image comparison apparatus of claim 7 further comprising: a check result display for displaying results of whether a match exists.

12. The image comparison apparatus of claim 7 further comprising: a personal identification keypad for receiving a personal identification code input to be compared with a previously stored personal identification code.

13. The image comparison apparatus of claim 7 further comprising: a card reader for reading a personal code stored on a card, said personal code to be compared with a previously stored personal code.

14. An image comparison apparatus, comprising:

an object detection sensor for detecting a person to be taken in an image;

a camera for creating at least one image of said person upon detection by said object detection sensor;

a check start button operable to cause the camera to create another at least one image of said person after said check start button is pressed;

an image comparison center apparatus for initiating a comparison of said at least one acquired image following operation of said check start button with a previously memorized registration image, and outputting a first comparison result including whether said at least one acquired image following operation of said check start button matches said registration image; and in the case where the first comparison result indicates no match, said image comparison center apparatus initiates a second comparison of one of the prior acquired images obtained prior to operation of said check start button and compares said prior acquired image and said registration image and outputs a second comparison result.

15. The image comparison apparatus of claim 14, where in the second comparison, said image comparison center apparatus compares said prior acquired image in order of timing beginning near a timing of said check button is pressed.

16. The image comparison apparatus of claim 14 further comprising:

an illumination device for illuminating a subject to be photographed by said camera.

17. The image comparison apparatus of claim 14 further comprising:

a check count display for displaying a number of times a check operation has been conducted.

18. The image comparison apparatus of claim 14 further comprising:

a check result display for displaying results of whether a match exists.

19. The image comparison apparatus of claim 14 further comprising:

a personal identification keypad for receiving a personal identification code input to be compared with a previously stored personal identification code.

20. The image comparison apparatus of claim 14 further comprising:

a card reader for reading a personal code stored on a card, said personal code to be compared with a previously stored personal code.

21. An image comparison method, comprising the steps of:

detecting a person to be taken in an image;

creating at least one image of said person upon detection;

pressing a check start button creating, after the pressing of the check start button, at least one image of said person;

initiating a comparison of said at least one image created after the pressing of said check start button with a previously memorized registration image; and outputting a first comparison result including whether said at least one acquired image created after the pressing of said check start button matches said registration image, where in a case where the first comparison result indicates no match, the method further comprises: initiating a second comparison of at least one of the images created prior to the pressing of said check start button, comparing said at least one of the images created prior to the pressing of said check start button and said registration image, and outputting a second comparison result.

22. The method of claim 21, wherein the second comparison act further comprises the step of:

comparing said at least one image created prior to the pressing of said check start button in the order of timing beginning near a timing of said check start button is pressed.

23. The method of claim 21 further comprising the acts of:

determining that said at least one image created prior to the pressing of said check start button does not match said previously memorized registration image; and comparing a personal identification code received at a personal identification keypad with a previously stored personal identification code to determine whether a match exists.

24. The method of claim 21 further comprising the acts of:

determining that said at least one image created prior to the pressing of said check start button does not match said previously memorized registration image; and comparing a personal identification code read from an identification card with a previously stored personal identification code to determine whether a match exists.

* * * * *